United States Patent [19]
> Nagy et al.

[11] 4,145,290
[45] Mar. 20, 1979

[54] SKIMMER FOR OIL SPILLS

[76] Inventors: Charles E. Nagy, 3221 Bend Pl., Hollywood, Calif. 90068; John F. Nagy, 785 W. End Ave., New York, N.Y. 10025

[21] Appl. No.: 819,704

[22] Filed: Jul. 28, 1977

[51] Int. Cl.² ............................................. E02B 15/04
[52] U.S. Cl. ................................ 210/242 S; 114/312; 210/DIG. 25
[58] Field of Search ............. 210/83, 242 S, DIG. 25; 114/235 B, 16

[56] References Cited

U.S. PATENT DOCUMENTS

| | | | |
|---|---|---|---|
| 2,876,903 | 3/1959 | Lee | 210/242 S |
| 3,495,561 | 2/1970 | Trapp | 210/242 S |
| 3,595,392 | 7/1971 | Markel | 210/DIG. 25 |
| 3,613,891 | 10/1971 | Cloutier | 210/DIG. 25 |
| 3,752,317 | 8/1973 | Lithen | 210/242 S |
| 3,756,294 | 9/1973 | Ramey | 210/242 S UX |
| 3,762,558 | 10/1973 | Anderson | 210/DIG. 25 |
| 3,809,002 | 5/1974 | Nagy et al. | 114/235 B |
| 3,966,613 | 6/1976 | Kirk et al. | 210/242 S |
| 3,966,614 | 6/1976 | Ayers | 210/DIG. 25 |
| 4,033,876 | 7/1977 | Cocjin et al. | 210/DIG. 25 |

*Primary Examiner*—Theodore A. Granger

[57] ABSTRACT

A skimmer is provided for removing oil spilled on the surface of a body of water. The skimmer has a hull which is submersible in the water and a coupler on the nose of the hull for coupling the skimmer to a towing vehicle. A surge tank is located within the hull for receiving oil and water skimmed from the surface. A funnel positioned on top of the skimmer and extending through the hull has an inlet end positionable in the spilled oil and an outlet end extending into the surge tank. In one embodiment the inlet end comprises a pivotable head that is held level with the surface of the liquid by an attached float. A conveyor within the funnel controls the flow of oil and water into the surge tank. A sensor at the funnel inlet controls a hydraulic jack located between the funnel and the hull to position the inlet in the oil on the water's surface. A conduit is provided between the surge tank and a conduit coupler on the rear of the hull for use in pumping oil out of the surge tank and into an outside conduit. In a preferred embodiment, a pair of doors are hinged to the inlet end for either closing the funnel or for opening outward in a spread position to gather and channel the oil into the funnel. The doors can be joined to the ends of a floating fence so that oil confined within the fence is directed into the funnel as the skimmer and fence are pulled through the oil spill.

16 Claims, 30 Drawing Figures

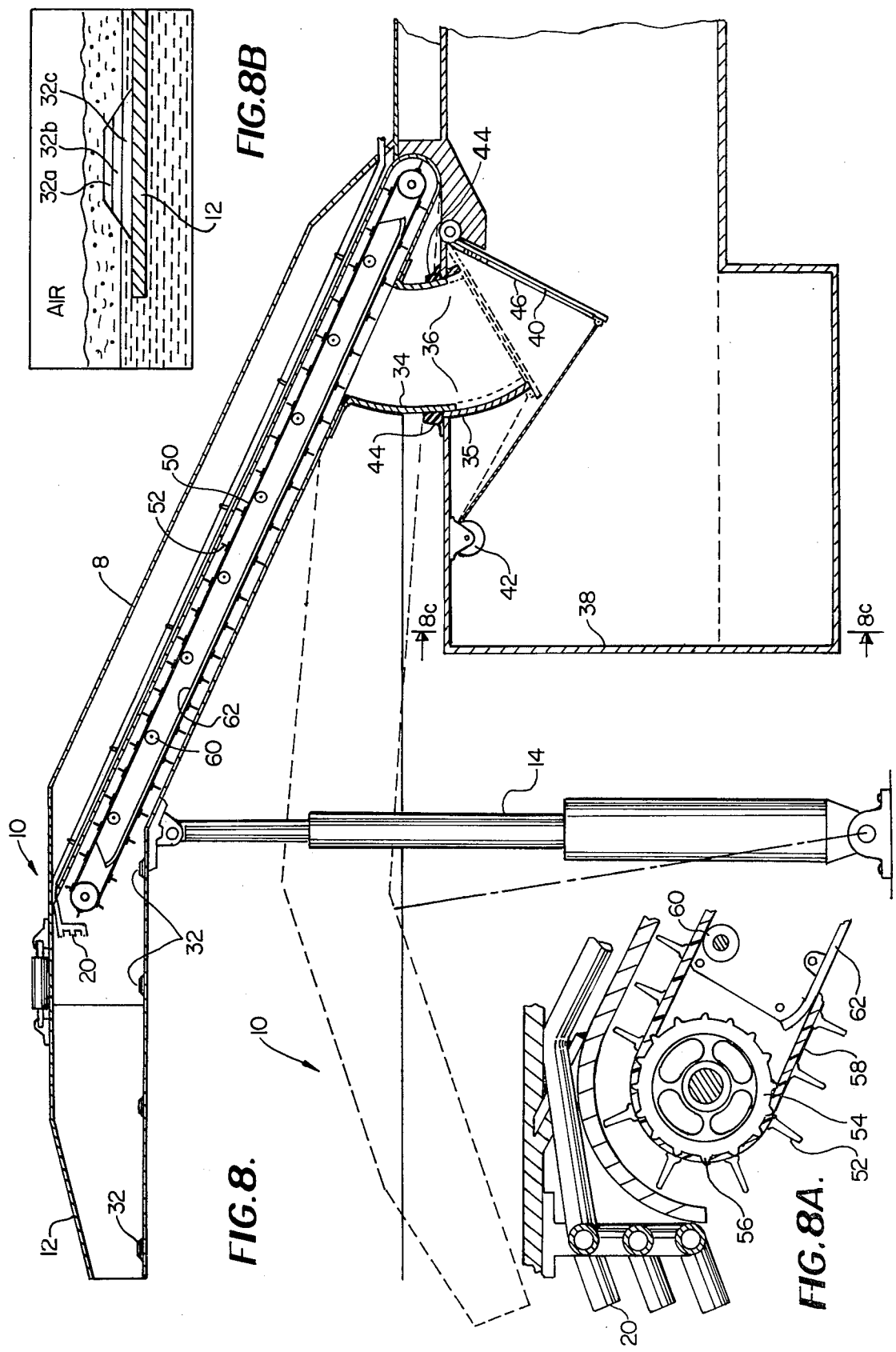

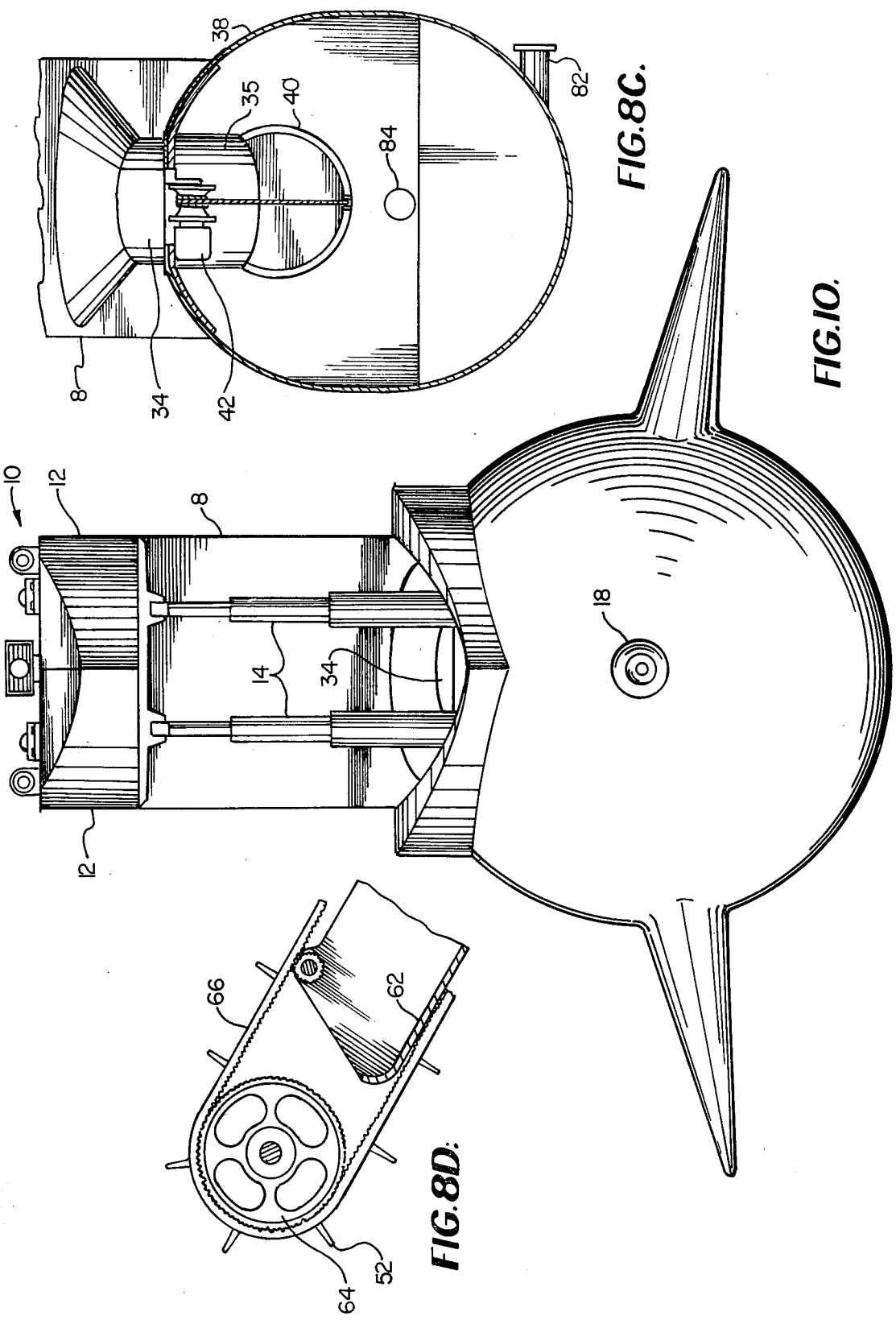

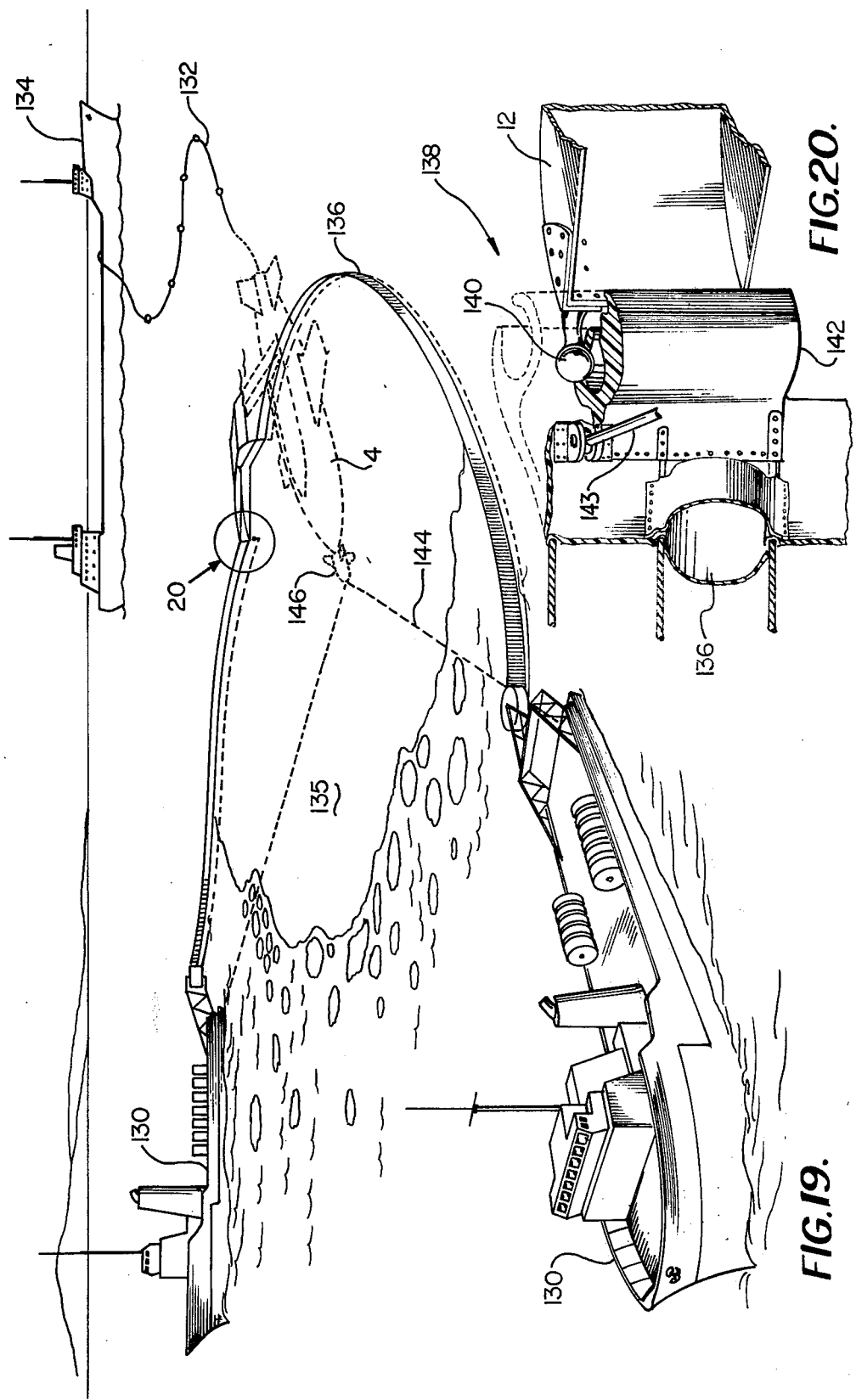

SKIMMER FOR OIL SPILLS

BACKGROUND OF THE INVENTION

DESCRIPTION OF THE PRIOR ART

An ever increasing need exists for equipment to clean up oil spilled on the surface of oceans and lakes by offshore drilling rigs and by large oil tankers. As more oil wells are drilled in offshore fields, and as these wells continue to move out into deeper and rougher water, such as the North Sea, the possibility of oil spills from offshore drilling increases.

Although the most sophisticated equipment available was used in drilling wells in the North Sea, a single oil blowout there caused more than 140,000 barrels of oil to be spewed out during the five days required to cap the well. This oil posed such a threat to the valuable fishing grounds that some oil operations were suspended for safety checks despite the great need for the oil.

Likewise, a blowout on an offshore well near Santa Barbara, Calif. caused oil to drift onto neighboring beaches. Despite expensive efforts by the oil companies to clean up the oil, the contamination of the beaches and the death of seafowl coated with the oil caused such an outcry from the coastal communities that the entire California offshore drilling program was threatened.

Similarly, the ever increasing volume of oil being transported in oil tankers has increased the danger of oil spills from tanker accidents. In 1967, the oil tanker Torrey Canyon spilled 114,000 tons of oil into the English Channel. Presently, approximately 4,500 oil tankers of various seaworthiness are transporting oil throughout the world. Many of these tankers have capacities between 200,000 tons and 500,000 tons. Oil spills from wrecked tankers are becoming a frequent occurence. Since they cannot be avoided entirely, means for decreasing the spread of oil from such wrecks are a necessity.

Prior art devices and methods for cleaning up oil spills are very limited in their effectiveness. Small oil-skimming boats which float on the surface have paddle wheels that move oil into an opening into the boat. These oil-skimming boats can only work in good weather on relatively thick oil slicks. A fleet of twenty oil-skimming boats was used in a blowout of 140,000 barrels of oil in the North Sea, and yet only about 3,000 barrels of oil was recovered. Further, such surface boats present a fire hazard, particularly in blowouts having large quantities of natural gas.

Oil booms, or floating fences, are used to contain oil spills. While these fences can prevent the spread of an oil slick, they cannot, of course, remove the oil from the surface.

Chemical dispersants are used to break up oil slicks and facilitate the eventual decomposition of the oil by the elements. However, these chemicals are expensive, introduce contamination themselves into the water, and do not recover any oil.

Due to the inadequacies of available oil clean up means, even fire has been used to prevent oil from spilling out of wrecked tankers and contaminating the surrounding water and beaches. The oil can be surprisingly difficult to ignite and the resulting fire can be dangerous and an environmental problem itself.

SUMMARY OF THE INVENTION

It is an objective of the invention to provide an improved device for removing oil from the surface of a body of water.

It is an objective of the invention to provide a device for recovering oil from the surface of a body of water.

It is an objective of the invention to provide a device which can skim oil from the surface of a body of water even in rough weather.

It is an objective of the invention to provide a device which can skim oil from the surface of a body of water without causing a fire hazard.

It is an objective of the invention to provide an improved oil-skimmer for cleaning up oil spills.

According to the invention, the oil-skimmer has a hull which is submersible in the water and a coupler on the nose of the hull for coupling the skimmer to a towing vehicle. A surge tank is located within the hull for receiving oil and water skimmed from the surface. A funnel positioned on top of the skimmer and extending through the hull has an inlet end positionable in the spilled oil and an outlet end extending into the surge tank. In one embodiment the inlet end comprises a pivotable head that is held level with the surface of the liquid by an attached float. A conveyor within the funnel controls the flow of oil and water into the surge tank. A sensor at the funnel inlet controls a hydraulic jack located between the funnel and the hull to position the inlet in the oil on the water's surface. A conduit is provided between the surge tank and a conduit coupler on the rear of the hull for use in pumping oil out of the surge tank and into an outside conduit.

In a preferred embodiment, a pair of doors are hinged to the inlet end for either closing the funnel or for opening outward in a spread position to gather and channel the oil into the funnel. The doors can be joined to the ends of a floating fence so that oil confined within the fence is directed into the funnel as the skimmer and fence are pulled through the oil spill.

Various arrangements can be used to move the skimmer across an oil slick. In one particularly effective arrangement, two spaced apart tow boats moving abreast of each other each have an underwater cable that is attached to the coupler on the nose of the skimmer to pull the skimmer along behind and between them. Also attached to each tow boat is a floating fence that extends behind the boats and is attached to the open doors of the skimmer. As the tow boats move through the oil slick the oil is confined between the two floating fences and guided into the inlet of the funnel.

BRIEF DESCRIPTION OF THE DRAWINGS

The invention will now be described in detail with reference to the accompanying drawings representing preferred embodiments of an oil-skimmer according to the present invention. In the drawings:

FIG. 8 is a side view, in cross-section, of the funnel, conveyor, and surge tank; FIG. 8A is a detail of the conveyor adjacent the funnel inlet utilizing a sprocket drive gear and mating belt; FIG. 8B is schematic detail of a surface sensor; FIG. 8C is a cross-section taken at 8C—8C showing the surge tank mounted in the skimmer hull; and FIG. 8D is a second embodiment of the conveyor utilizing a notched belt and notched drive wheel;

FIG. 10 is a front end view of the oil-skimmer with the funnel in the raised, closed position.

FIG. 19 shows the oil-skimmer and a floating fence being towed by two surface boats through an oil slick and a surface tanker receiving the skimmed oil from the submerged oil-skimmer;

FIG. 20 is an enlarged perspective view, partly in cross-section, of a coupler for joining the fence to a door of the funnel;

DESCRIPTION OF THE PREFERRED EMBODIMENTS

Figure 1:
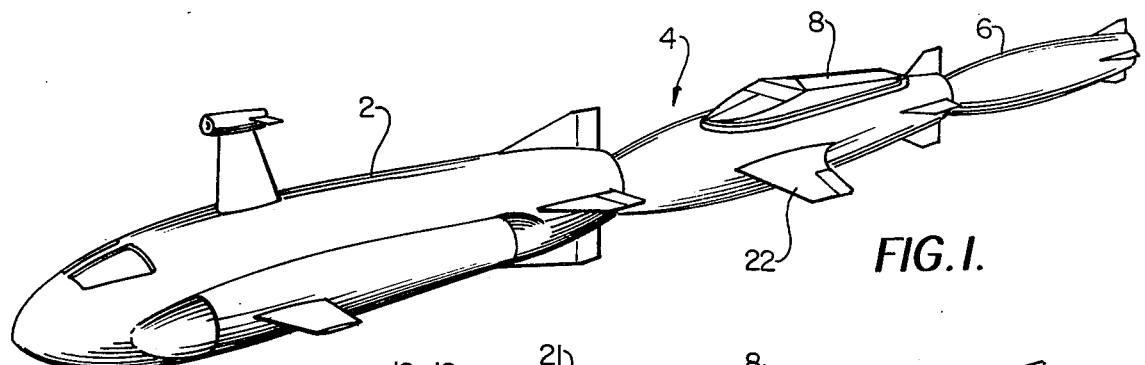
FIG. 1 is a perspective view of a submarine tow boat pulling an oil-skimmer and tanker under the surface of the water.

FIG. 1 shows a tow submarine 2 pulling a skimmer 4 and a tanker submarine 6 under water. The funnel 8 of the skimmer 4 is in the closed position indicating that the skimmer 4 is either being towed to an oil spill to clean up the oil or leaving the oil spill with a full tanker 6.

Figure 2:
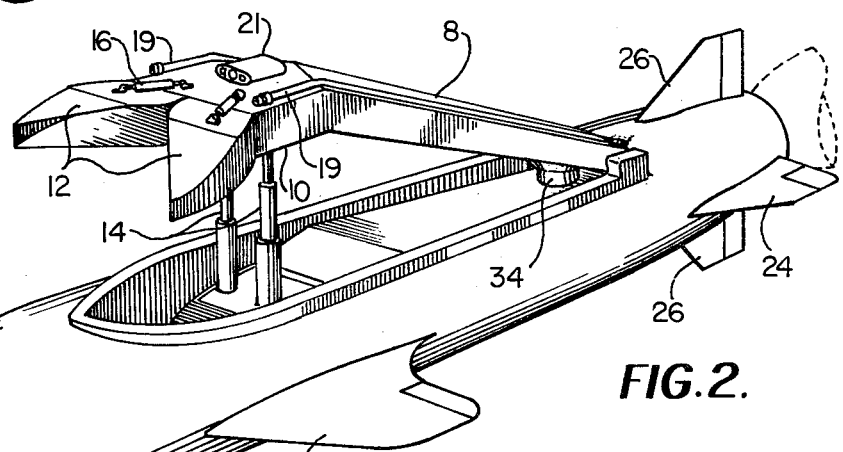
FIG. 2 is a perspective view of an oil-skimmer with the funnel in a raised position.
Figure 3:
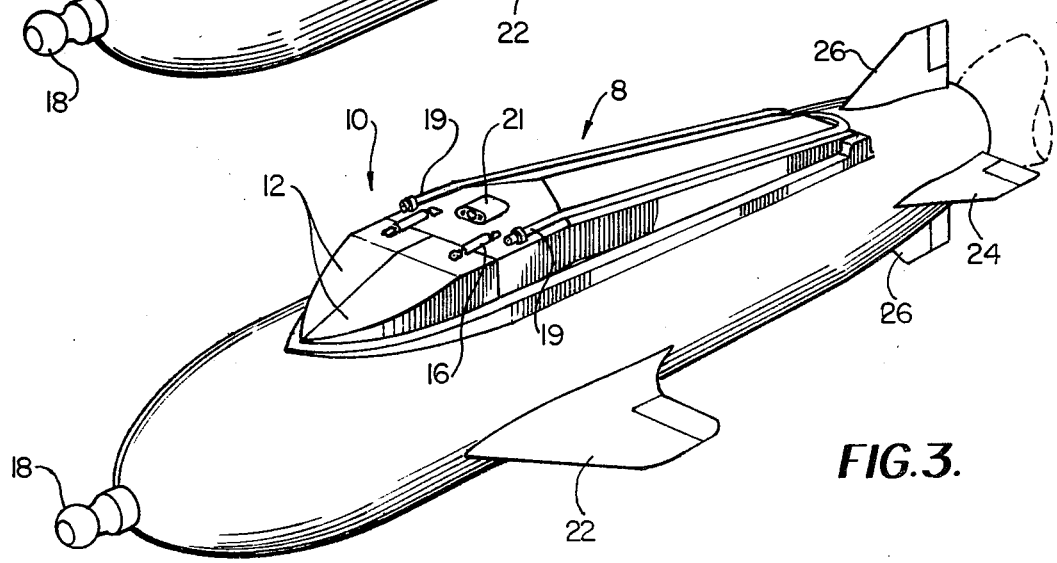
FIG. 3 is a perspective view of an oil-skimmer with the funnel in a lowered position.
Figure 4:
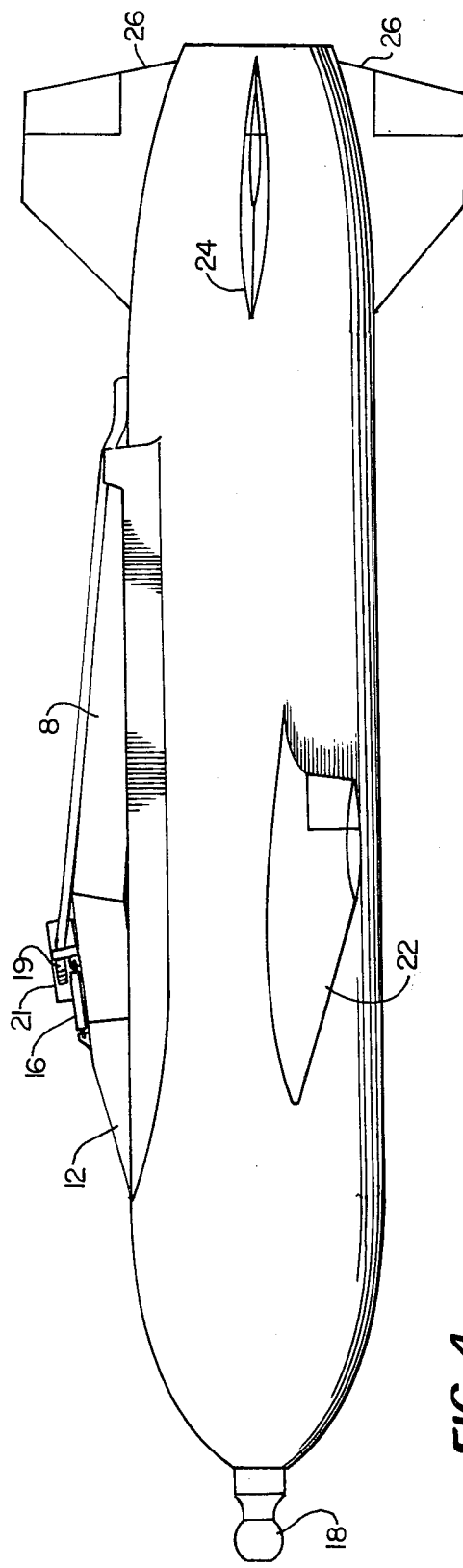
FIG. 4 is a side view of an oil-skimmer with the funnel lowered.
Figure 5:
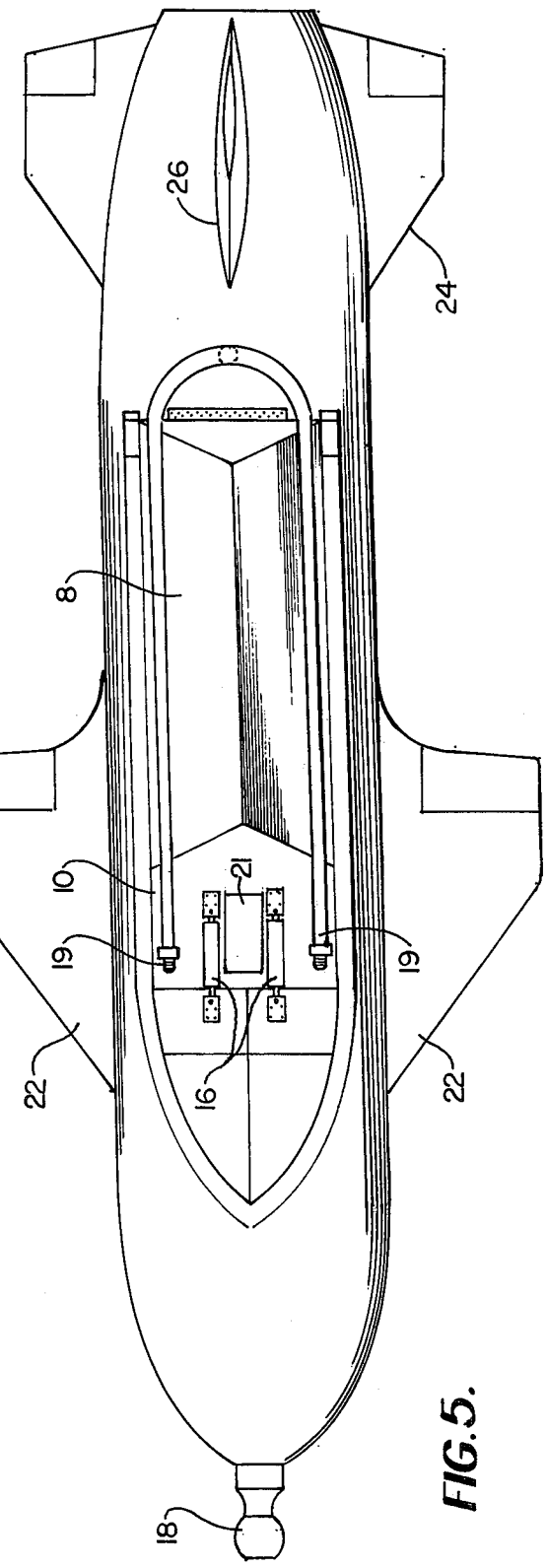
FIG. 5 is a top view of the oil-skimmer shown in FIG. 4.

FIG. 2 shows skimmer 4 with the funnel 8 in the raised position. The funnel 8 has an inlet head 10 with a pair of doors 12 hinged to it. A pair of hydraulic jacks 14 join the inlet head 10 of the funnel to the skimmer 4 and are used to raise and lower the funnel 8. Jacks 16 are used to open and close doors 12. In the open position shown in FIG. 2, the skimmer 4 is prepared to skim oil from an oil spill into the inlet head 10 and down the funnel 8 into the skimmer.

A coupler 18 is provided on the nose of the skimmer for coupling the skimmer to a towing vehicle such as submarine 2. Suitable self-connecting lock coupling devices for such coupler 18 are described in U.S. Pat. Nos. 3,809,002 and 3,666,216 both by the present inventors. In a second embodiment, coupler 18 can include electrical coupling means as well as the mechanical coupling means required to pull the skimmer. The electrical coupling means can be used to furnish electrical power and electrical control signals from the towing vehicle to the skimmer. Suitable couplers 18 for automatically providing both mechanical and electrical coupling of the skimmer to a tow vehicle are also described in the previously mentioned U.S. Pat. No. 3,809,002.

Water spray nozzles 19 can be provided on top of the funnel inlet to control any fire adjacent the inlet. When used with additional water spray nozzles 20 located inside the funnel (see FIGS. 8, 8A, and 11), the skimmer is protected from fire hazards and, in some circumstances can be used to skim oil even during an oil fire. Water for these fire nozzles is provided by a pump within the hull which pumps water from below the floating oil into the nozzles.

Although not essential for operation of the skimmer, an underwater television system can be used with the skimmer. As shown in FIGS. 2–7, a miniature underwater television camera and light 21 can be mounted on top of the funnel inlet 10. The camera can be used to assist in guiding the skimmer and in maintaining the proper elevation of the funnel inlet 10. Suitable underwater television systems are available in the art, some small enough to be attached to commercial diving helmets.

Figure 18:
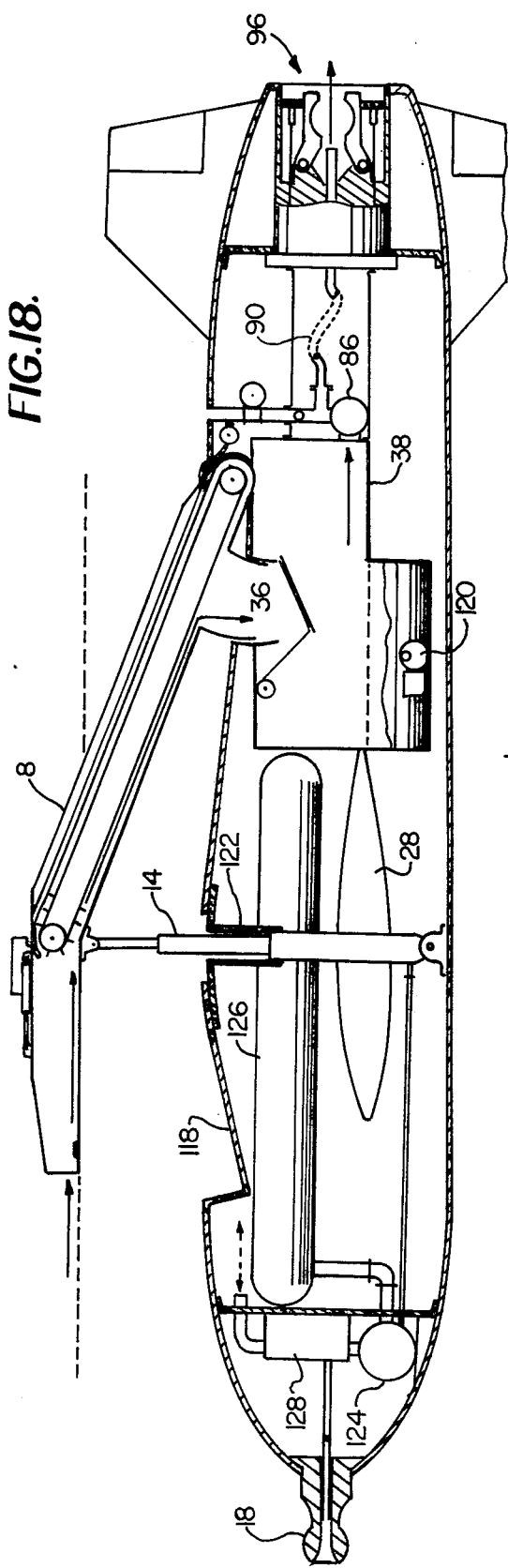
FIG. 18 is a longitudinal cross-section of the oil-skimmer.

Horizontal fins 22 and tail fins 24, 26 provide guidance and stability for the skimmer as it is towed through the water. As shown in FIG. 18, ballast tanks 28 in the horizontal fins 22 are filled with with water as necessary to assist in maintaining the proper depth of the skimmer in the water. Ballast pumps controlled by known pressure-sensitive indicators are used to maintain sufficient ballast in the ballast tanks. With proper connection of the skimmer 4 to a tow vehicle 2, such as shown in FIG. 1, control of the depth of the skimmer can be readily obtained with little adjustment of the ballast.

Top and side profiles (FIGS. 4 and 5) of the skimmer, show the compact streamlined shape of the skimmer with the funnel 8 in the retracted position. In this configuration, the skimmer can be easily and safely towed under the water in rough weather which would be hazardous for surface vessels of a similar size.

Figures 6, 7:
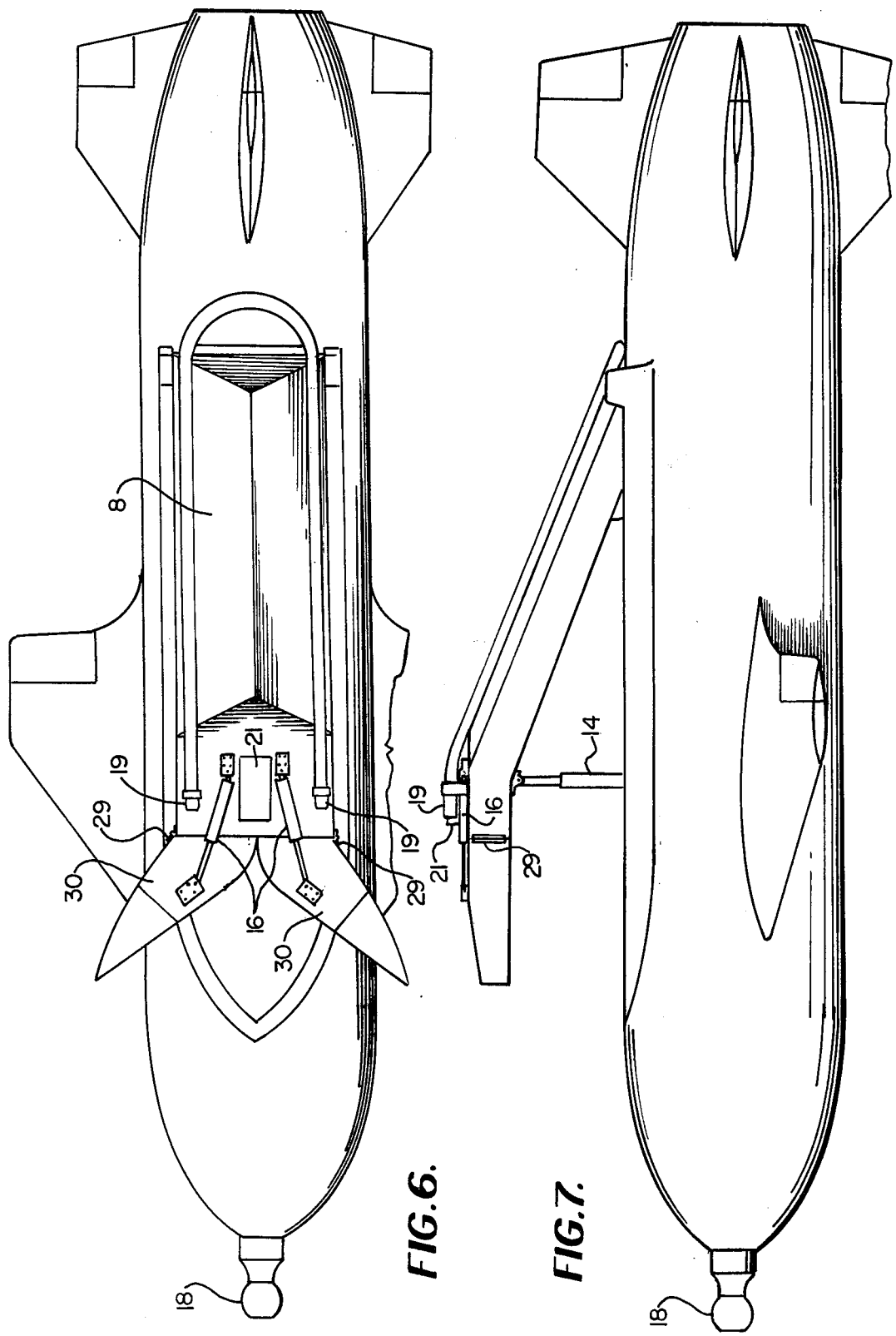
FIG. 6 is a top view of the oil-skimmer shown in FIG. 4 with the funnel raised and the doors open.
FIG. 7 is a side view of the oil-skimmer shown in FIG. 6.

FIGS. 6 and 7 are top and side views, respectively, of the skimmer with the funnel in the open, raised position for skimming oil. The doors 12 are joined to the funnel 8 by hinges 29 and they have extensions or fan plates 30 which help guide the oil into the funnel. In the closed position, these fan plates 30 are tucked inside the funnel.

Hydraulic pistons 16 on the top of the funnel are used to open and shut the doors. These pistons can be readily controlled in a known manner using electrically controlled valves. Signals for controlling these valves as well as for controlling other equipment within the skimmer can be provided by a separate electrical cable to the skimmer or by a cable extending through coupler 18 as previously mentioned. Other methods of providing control signals to the skimmer can be provided by utilizing known techniques such as radio or radar control.

Water spray nozzles 19 are provided on the top of the funnel to fight fire, as previously described.

FIG. 8 is a side view in partial cross-section of the funnel 8. The solid lines show the funnel in the raised position and the broken lines show the funnel in the lowered position. Hydraulic piston 14 is connected to the funnel and skimmer hull 118 by pivots which allow the funnel to rotate into position about its hinged connection adjacent its outlet end.

A liquid surface sensor 32 (or plurality of sensors) is located on a bottom surface inside the door 12. As shown in FIG. 8B this sensor has three portions, an upper portion 32a for indicating an air environment, a bottom portion 32c for indicating a water environment, and a center portion 32b for indicating an oil environment. Of course, three separate sensors at different elevations on the door or inlet could be used. Suitable fluid sensors are available and well known in the fluid level sensor field. Signals from sensor 32 are used to control a valve or to pump air or hydraulic fluid to jacks 14 so that the elevation of the funnel inlet can be maintained in the oil-water interface. A two part sensor indicating either the air-liquid interface or the oil-water interface could also be used to control the elevation of the funnel inlet.

The outlet end of the funnel 8 has a curved slip pipe 34 which mates with a curved slip pipe 35 leading into the tank 38 from an opening 36 in surge tank 38. A surge tank door 40 is provided for closing against the end of the mating slip pipe 35. A cable and a powered winch 42 are used to move and hold door 40 in the closed position, when surge tank 38 is full as indicated by a float switch. When it is desired to stop the skimming operation, the inlet doors 12 of the funnel are closed and after the funnel is emptied of its load, the power winch 42 pulls door 40 closed.

Seal means such as rubber lip 44 and a rubber pad 46 are used to seal the surge tank. Additional seal means well known in the art are used to seal other parts of the skimmer as required. Sealing, however, is not a critical problem because ballast tanks can be used to maintain the desired bouyancy of the vessel. Additionally, pumps such as pump 86 (see FIG. 14) are provided to empty surge tank 38 and these pumps can readily remove any liquid leaking into the surge tank.

FIG. 8C shows a front view of the outlet end of funnel 8. The surge tank door 40 is shown in the open position hanging down inside tank 38. The powered winch 42 is mounted on the top inner wall of tank 38 and is connected to door 40 by a cable. When the power winch 42 is activated, door 40 is pulled closed against the bottom opening in the mating curved slip pipe 35 which is joined to the opening in the tank and extends inside the tank. The curved slip plate 34 which is fastened to the funnel 8 slides inside mating curved pipe 35 when funnel 8 is raised or lowered.

As shown in FIG. 8, a conveyor 50 is provided within funnel 8 to control the flow of liquid down the funnel. The paddles 52 on the conveyor also help skim off the oil from the surface of the water. FIG. 8A shows an embodiment of the conveyor having a drive or guide wheel 54 having projections 56 for mating with holes in a rubber conveyor belt 58. Rollers 60 keep the top of the belt in position, and bearing plate 62 keeps the bottom of the conveyor belt in position. FIG. 8D shows another embodiment of the conveyor utilizing a notched guide or drive wheel 64 which mates with a notched rubber belt 66.

Figure 9:
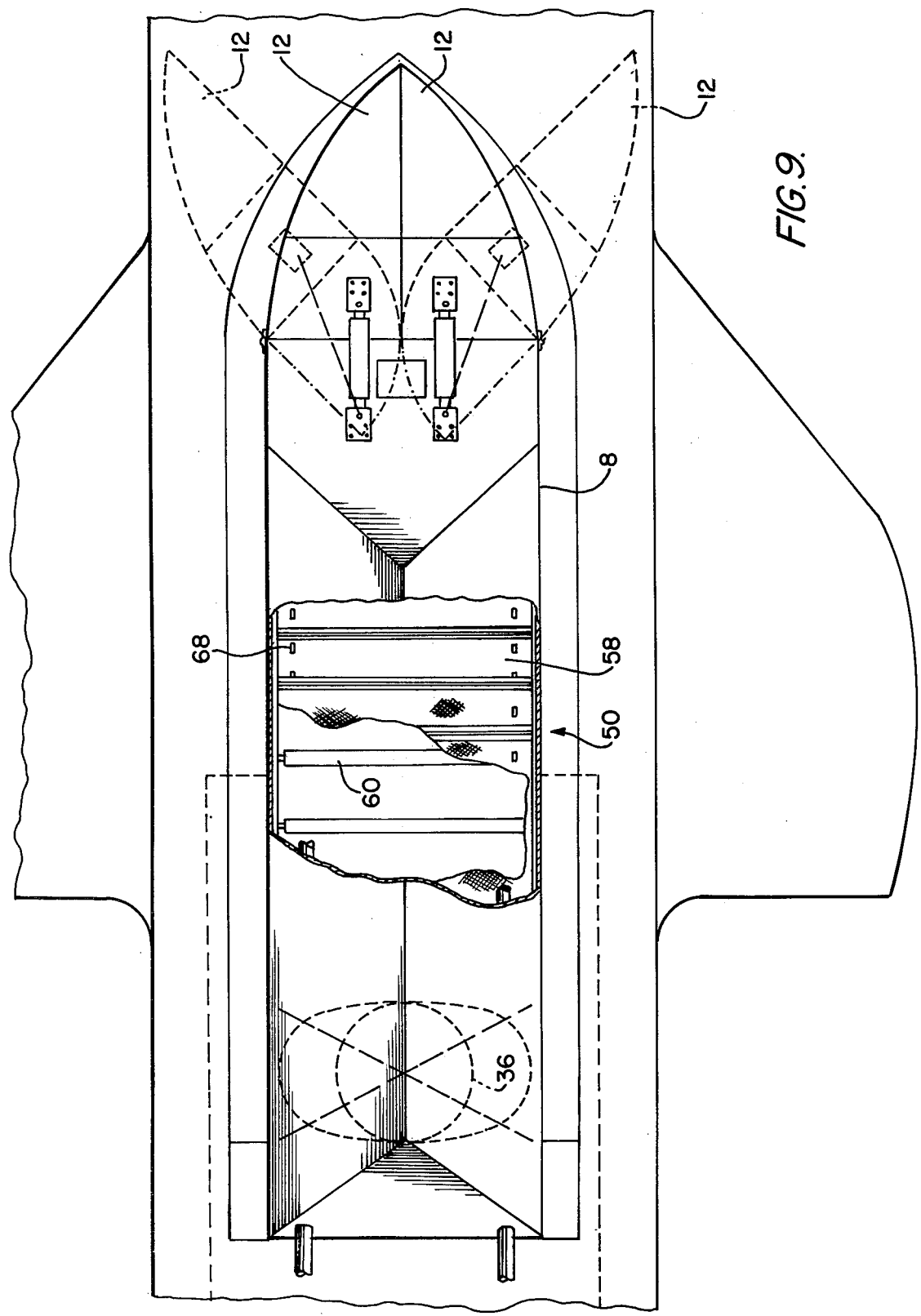
FIG. 9 is a top view of the funnel showing the doors in the closed position (solid lines) and in the open position (dashed lines) with a portion of the funnel cover removed to show the conveyor inside.

A top view of the conveyor 50 is shown in the cutaway of the funnel 8 of FIG. 9. The holes 68 in the belt 58 mate with the projections 56 in the guide or drive wheel 54. Rollers 60 are shown in the cutaway of the conveyor belt 58.

Figure 10A:
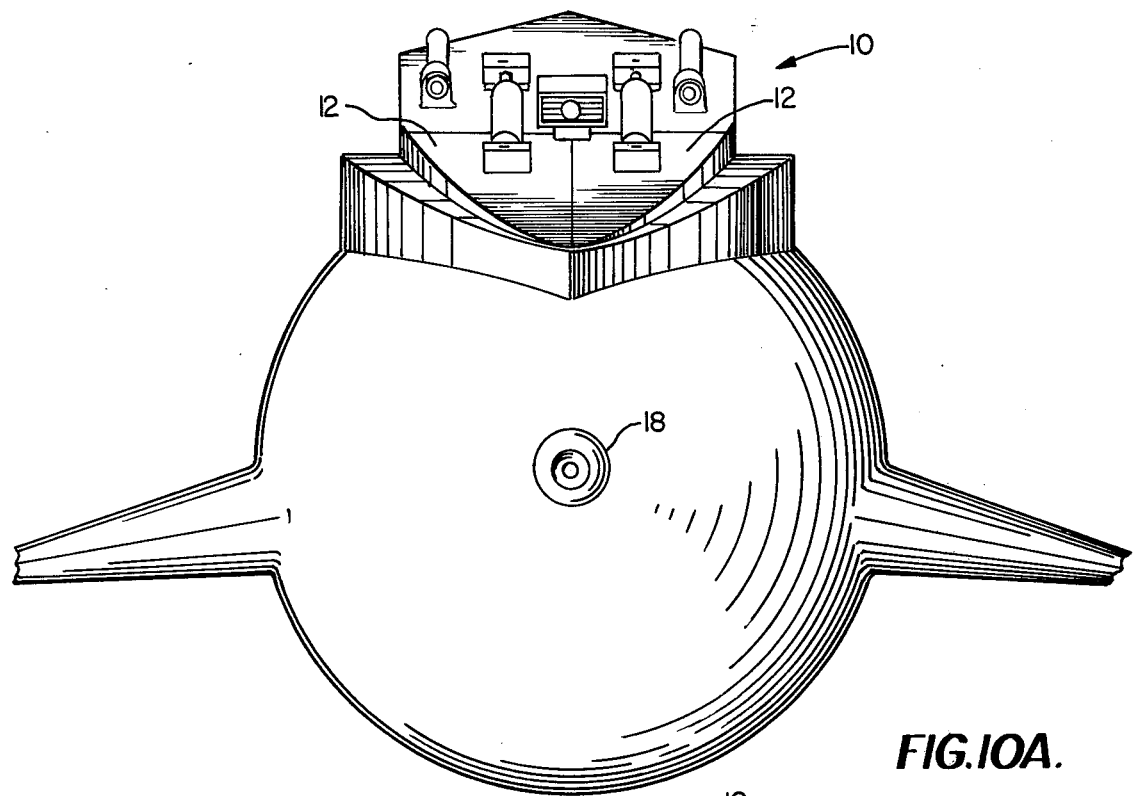
FIG. 10A is a front end view of the skimmer as shown in FIG. 10 except with the funnel in the lowered, closed position.
Figure 10B:
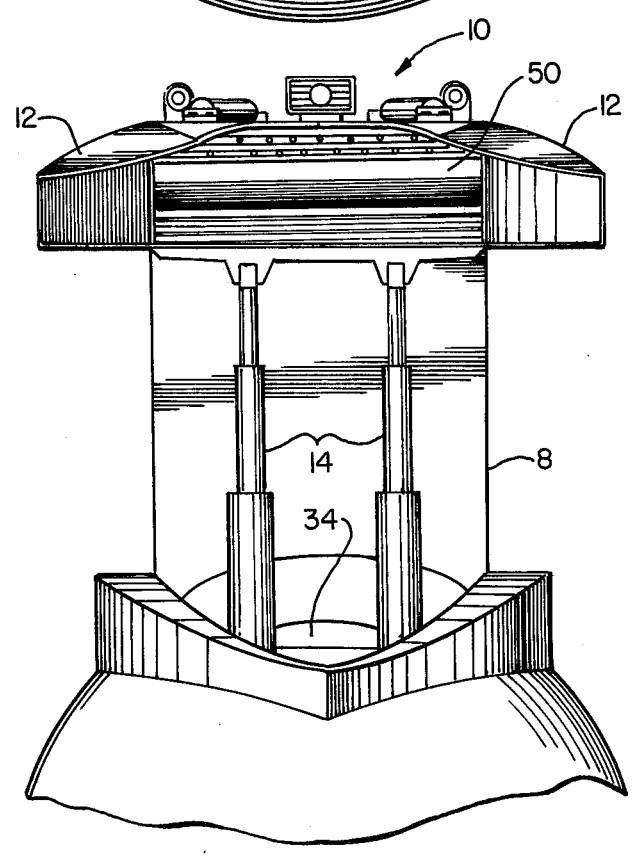
FIG. 10B is a front end view of the skimmer as shown in FIG. 10 except with the funnel in the raised, open position.

FIG. 9 clearly shows the large increase in the width of the sweep path obtained by moving doors 12 from the closed position (solid lines) to the open position (broken lines). In a preferred embodiment, the doors 12 can open to provide a maximum sweep path of 35 feet. In such embodiment, the maximum difference in elevation between the lowered position of funnel head 10 (FIG. 10A) and the raised position (FIG. 10B) is 19 feet. Thus, the funnel head can be raised and lowered within this range to skim oil from the tossing surface of the water without changing the depth of the skimmer hull in the water. FIG. 10B shows how the open doors 12 funnel oil into the conveyor 50 which paddles the oil down into the tank inside the skimmer.

Figure 11:
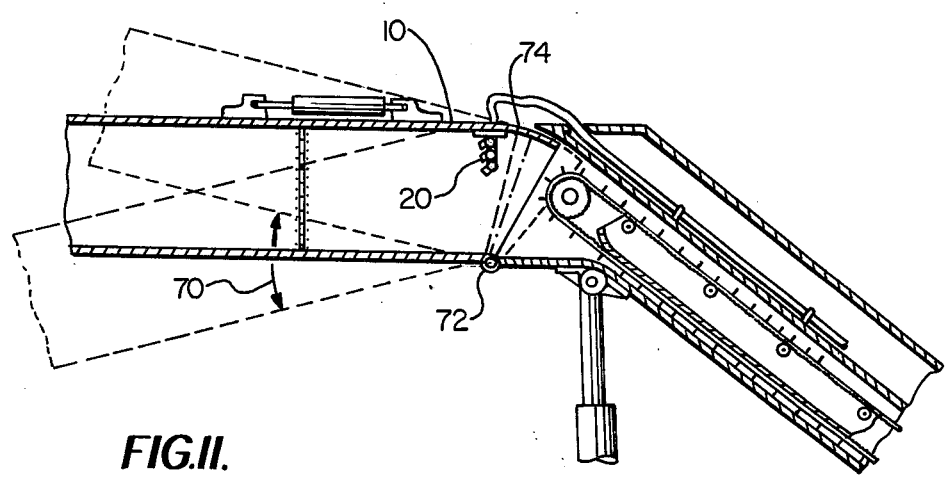
FIG. 11 is a side view, in cross-section of the inlet head of the funnel showing the head in three possible positions.

In the preferred embodiment the inlet head 10 of the funnel 8 is hinged to the funnel to permit vertical adjustment of the inlet as shown by arrows 70 of FIG. 11. Hinge 72 joins the bottom of the inlet head 10 to the rising portion of funnel 8 and slip joint 74 joins the top of the inlet head 10 to the funnel. Without such adjustment, the vertical angle of the inlet head would vary with its elevation, as shown by the broken lines in FIG. 8.

Figure 12:
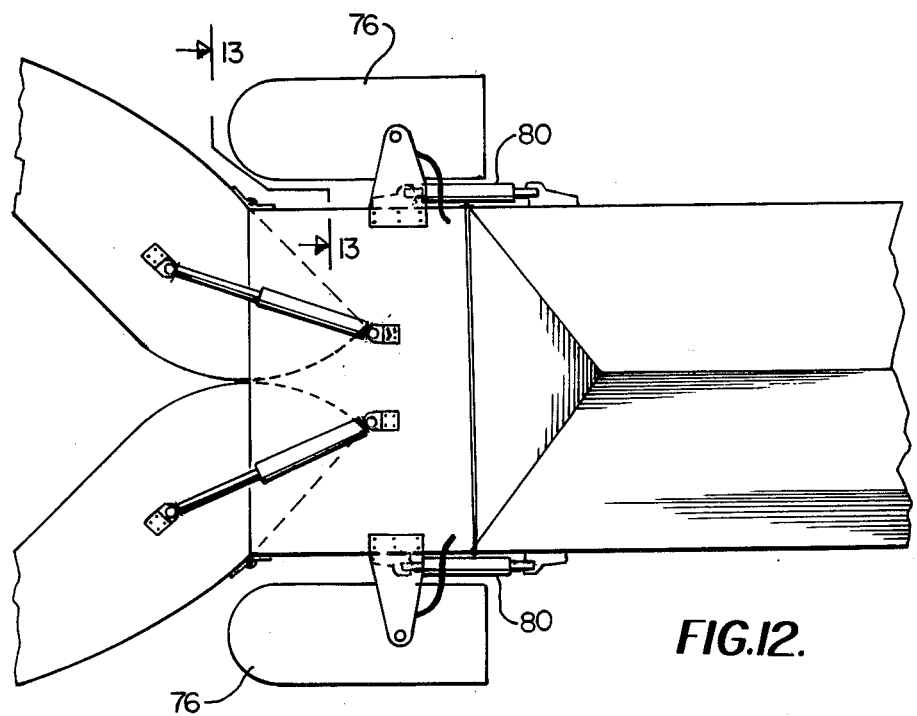
FIG. 12 is a top view of the inlet head shown in FIG. 11.
Figure 13:
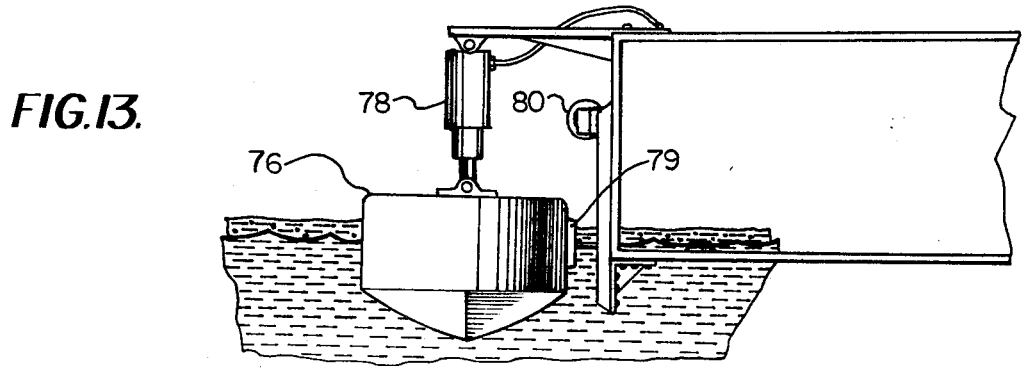
FIG. 13 is a partial cross-section 13—13 of FIG. 12.

To maintain inlet head 10 at a proper vertical angle with respect to the surface being skimmed, floats 76 and adjusting means 78 are provided on the sides of the inlet head 10 as shown in FIGS. 12 and 13. As the skimmer encounters waves, floats 76 raise and lower the inlet head 10 to keep it parallel to the plane of the water surface while jacks 14 raise and lower the funnel to keep it at the proper elevation. Floats 76 will attempt to stay parallel with the surface of the water. When the surface of the water changes from horizontal, the floats 76 tend to follow. Thus, a torque is developed between the floats and the inlet head. A torque following control 79 utilizes this torque to control hydraulic cylinders 80 which expand or contract in response to control 79 as necessary to keep inlet head 10 level with the water surface.

Adjusting means 78 are used to set the relative elevation between the inlet head 10 and the floats 76. Additionally, the cylinders on each side of head 10 can move independently of each other so that the heights of the floats can vary relative to each other in response to waves traveling across the inlet head opening.

In a simple embodiment of the invention, the surge tank 38 has a single opening near its bottom and a conduit leading from the opening to a conduit coupler on the hull of the skimmer. When coupled to a tanker outside the skimmer, liquid in the surge tank can be pumped from the surge tank into the tanker using a pump on the tanker.

Figures 14, 15:
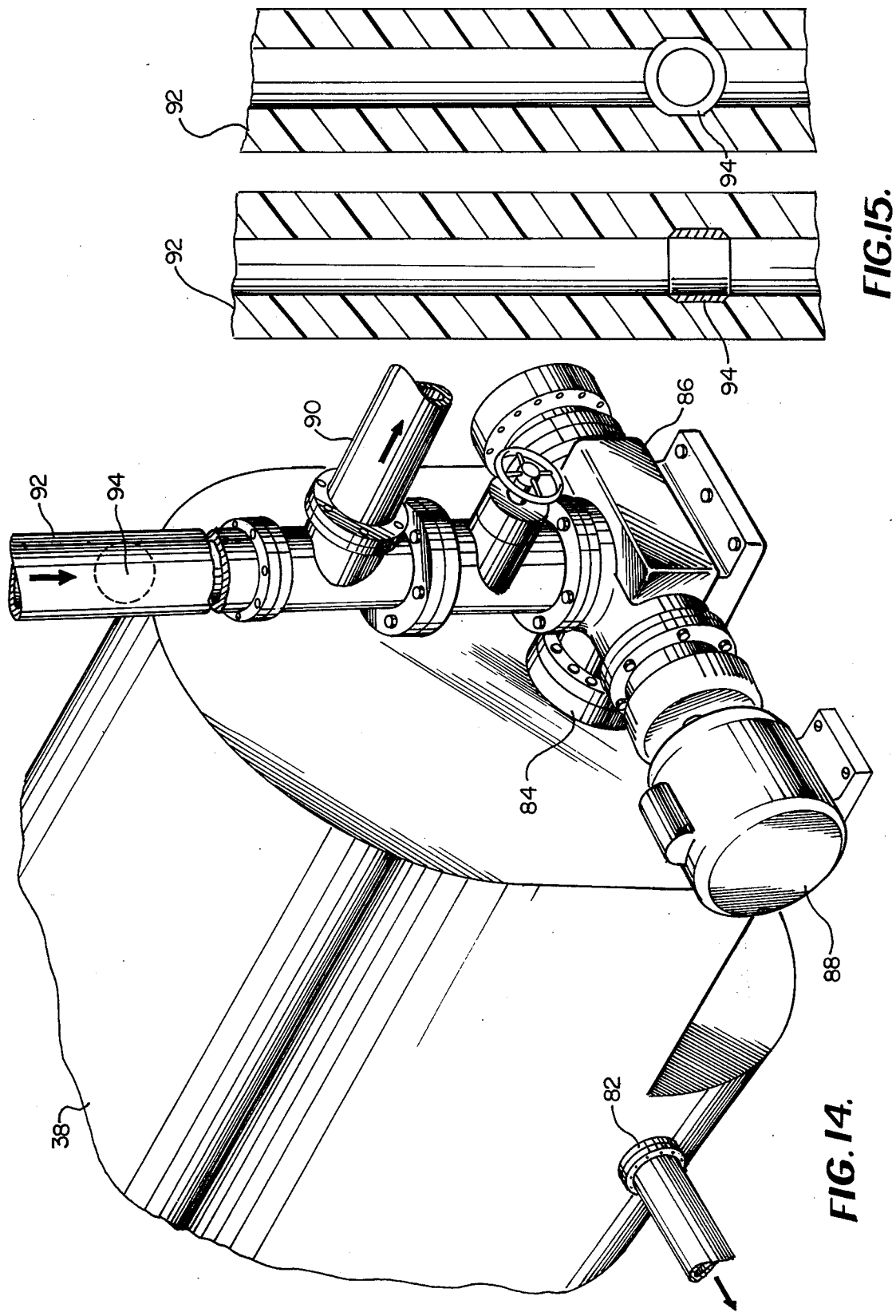
FIG. 14 is a perspective view of the surge tank showing conduits and pumps for emptying oil from the tanks.
FIG. 15 shows details of the valves used in the conduits.

More elaborate means for removing liquid from the surge tank can also be provided. For example, a water exit 82 can be provided at the bottom of surge tank 38 and an oil exit 84 provided somewhat higher up on tank 38 as shown in FIGS. 8C and 14. These exits can be coupled by conduits to external pumps as described above. Alternately, on-board pumps can be provided as shown in FIG. 14 for the oil exit 84. A simple float or other known liquid level sensor can be used to turn the pumps on and off. A wide variety of efficient pumps of adequate capacity are commercially available. Oil pump 86 is a twin screw pump 86 driven by motor 88 to pump oil out of tank 38 through oil conduit 90 and into the external storage tanker. Additionally, a supply of water pumped from outside the skimmer through flush conduit 92 can be used to purge oil conduit 90 prior to uncoupling the oil conduit from an external oil storage tanker.

Compact ball valves such as Hydril Wellguard safety valves are available for controlling the flow of oil or water through lines 90, 92. FIG. 14 shows such a valve 94 positioned within flush conduit 92, and FIG. 15 shows how such a valve is rotated inside flush conduit 92 to open and close the conduit.

An on-board pump such as pump 86 may also be provided for emptying water from the bottom of tank 38 to overboard. Although the skimmer is designed to take in as little water as possible, some water will unavoidably be included with the skimmed oil. As previously mentioned, sensors are available for detecting the presence of specific liquids. Such a water detector positioned adjacent water outlet 82 may be used to control the water pump. Similarly, an oil sensor located adjacent oil outlet 84 may control the operation of oil pump 86.

Figures 16, 16A:
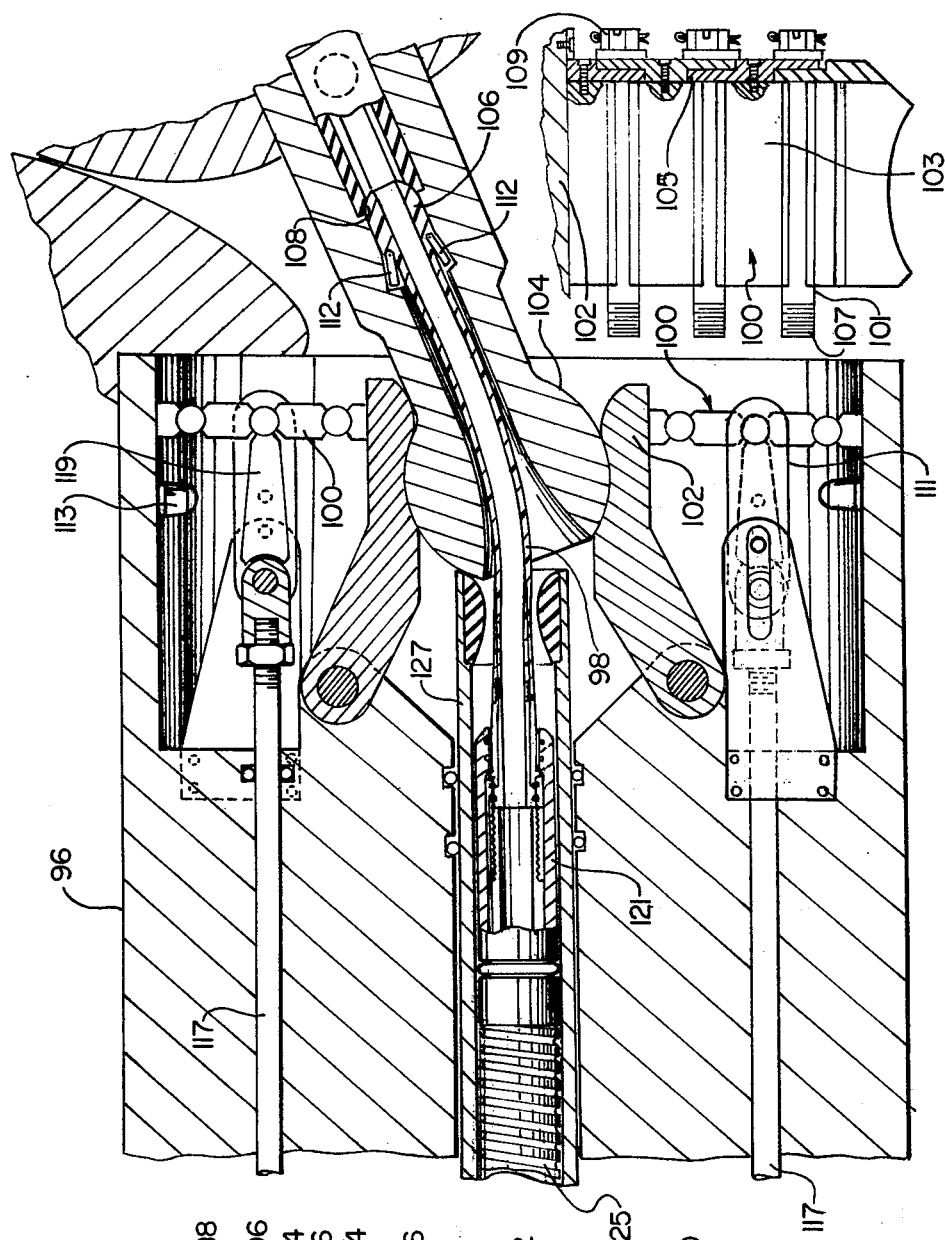
FIG. 16 is a side view in cross-section of a conduit coupler for joining the surge tank conduit to an outside conduit.
FIG. 16A is an end view of the compression hinge of FIG. 16.
Figure 17:
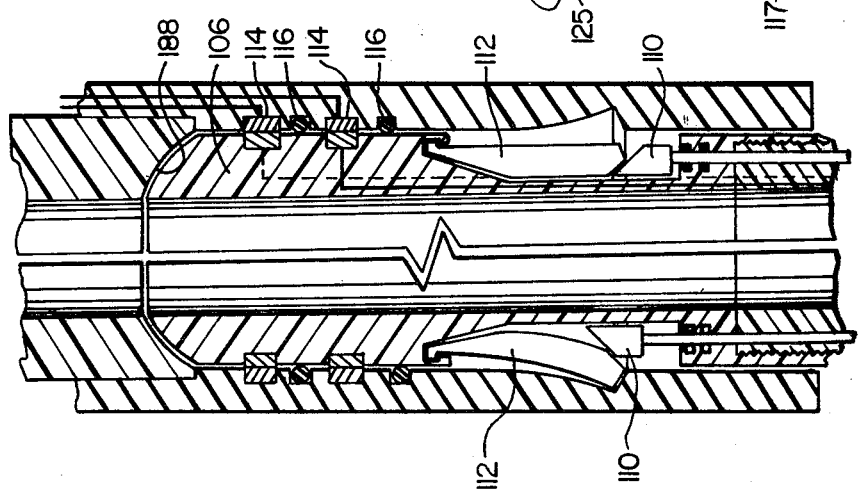
FIG. 17 is an enlarged, split view of the sealing and locking mechanism used to join the surge tank conduit to an outside conduit, one side of the split view showing the mechanism in the closed position and the other side showing the mechanism in the open position.

A suitable conduit coupling means 96 for coupling the oil skimmer 4 to a tanker submarine 6 (FIG. 1) is shown in FIGS. 16 and 17. This coupling means is similar to the couplers shown in previously mentioned U.S. Pat. Nos. 3,809,002 and 3,666,216, except that a flexible fluid passage 98 through the center of the coupling is provided. Additionally, high strength compression hinges 100 are used to lock jaws 102 firmly around the mating ball 104. The male portion 106 of the fluid passage 98 seats against a resilient, seal-type valve seat 108 and is held against seat 108 by spring lock keys or harpoon hooks 112. Hydraulic actuated wedges 110 are utilized to disengage lock keys 112 when decoupling the tanker as shown in FIG. 17.

Electrical coupling is provided by contacts or electrical slip rings 114 which are sealed from fluid by O-ring seals 116. The use of a ball coupling 104 and flexible fluid passage 98 through the coupling 96 permits considerable angular motion between the skimmer and the tanker. An automatic ball valve 94 as previously described is used in the fluid passage to close the passage when the joint is decoupled.

FIG. 16A is a partial end view of the conduit coupling 96 showing details of high compression hinge 100. Such hinge is particularly appropriate for the present application because its main load-carrying elements, full floating compression hinge pins 101 and high compression load hinge plates 103, are stressed mainly in compression. Therefore, hinge 100 can keep locking jaws 102 firmly clamped around tow ball 104 despite high separation loads which may occur between the vessels during rough seas. End plates 105 held on threaded ends 107 by nuts 109 hold the hinge elements together when the hinge is retracted by tie plate 111. Hinge stops 113 are provided to stop hinge 100 when it is in the retracted or open position.

Figure 16B:
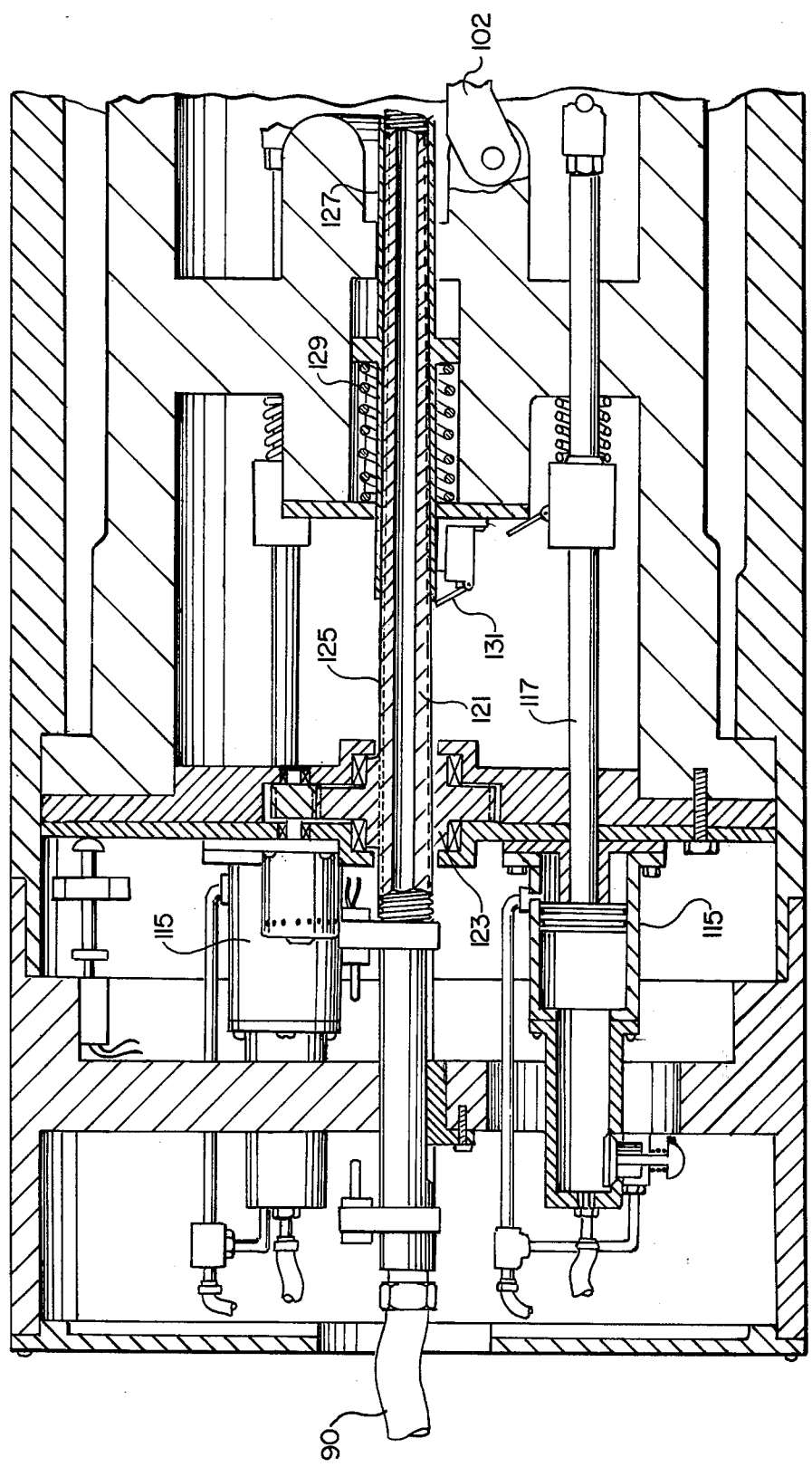
FIG. 16B is a continuation of the cross-section of FIG. 16 showing the coupling control mechanism.

As shown in FIGS. 16 and 16B, hydraulic cylinders 115 are used to extend or retract actuator arms 117 and close or open jaws 102. High strength floating link 119 operates in compression to close and hold closed hinge 100.

Extendable nozzle 121 is used to slip flexible fluid passage 98 into the mating ball joint connector. The nozzle 121 is extended or retracted by means of a gear nut mechanism 123 working against nozzle 121 through mating threads 125. Sensing piston 127 is held in the extended position by compression spring 129 and actuates switch 131 to control the location of extendable nozzle 121. Other details and embodiments of a similar coupler are contained in the previously mentioned U.S. Pat. Nos. 3,809,002 and 3,666,216.

Various modifications of the above described coupling means can be utilized depending upon the particular mode of operation of the skimmer. For example, the vessel used to tow the skimmer can itself serve as a tanker for the collected oil. In such case coupler 18 can contain a fluid passage such as shown in FIG. 16 and be coupled to surge tank 38, or a separate conduit can be provided. The skimmer can have batteries for powering the pumps and other on-board electrical equipment. External power to charge the batteries or drive the equipment can be provided through the couplers 18 and 96 as previously described, or a separate conventional electrical coupling can be provided.

Means of ballasting and operating submarines are, of course, well known and do not constitute the novel feature of the present invention. FIG. 18 is a longitudinal section of the oil skimmer to show an overall arrangement of some of the components of the skimmer within the hull 118. Coupler 18 for towing the vessel and for providing external electrical power is shown in the bow, and the conduit coupling means 96 is shown in the stern. Oil conduit 90 connects oil pump 86 and surge tank 38 to conduit coupling means 96. A water pump 120 connects the bottom of the surge tank 38 to an overboard conduit.

Funnel 8 has a curved slip pipe providing an outlet into tank 38 through opening 36. The configuration of the top of the hull 118 permits streamline nesting of funnel 8 in the lowered position. A sliding seal 122 is provided around jacks 14 to prevent leakage of water into the skimmer. A compressor or hydraulic pump 124 or a combination of both provides air and/or hydraulic pressure to operate the various jacks and to displace water in ballast tank 28 using air from air tank 126. Electrical power for compressor 124 and other electrical devices in the skimmer is supplied from batteries and electrical connectors in 128.

FIG. 19 shows a mode of operation in which skimmer 4 is pulled by a pair of towing surface vessels 130. In this mode, the automatic coupling mechanisms described in the previously mentioned U.S. Pat. Nos. 3,809,002 and 3,666,216 are ideal for couple 18. A conduit coupling means 96 such as shown in FIG. 16 can be used to couple the surge tank oil conduit 90 to an external oil conduit 132 which feeds into a surface tanker 134.

As shown in FIG. 19 the oil spill 135 can be confined and more efficiently collected into skimmer 4 by using a pair of floating oil booms or fences 136. Inflatable fences that can be deployed readily from the rear of the towing vessels (such as Goodyear's Sea Sentry booms) are commercially available for such an application. One end of each fence 136 is connected to a fence coupler 138 on the doors 12 of skimmer 4. As the skimmer is pulled through the oil spill 135, the fence gathers the oil and directs it to the funnel inlet of the skimmer where it is moved by the conveyor down into the surge tank, as previously described.

A door to fence coupler 138 which permits easy disengagement from the skimmer is shown in FIG. 20. A ball 140 on the end of a door 12 fits inside a channel socket 142 on the end of the fence 136. The door 12 can be uncoupled from floating fence 136 by lowering the door below the surface of the water. This causes ball 140 to slip out of channel socket 142. Tie rod 143 joins the ends of fence 136 together so that the fence does not place a load on the doors 12. A second tie rod can also extend across the lower ends of fence 136 if necessary to keep the fence properly oriented.

Figure 22:
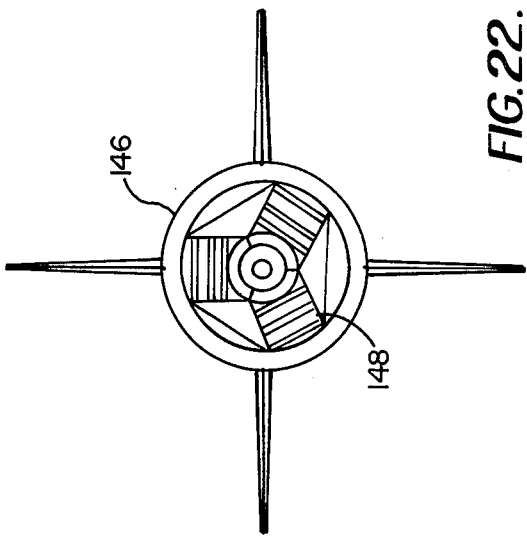
FIG. 22 is a rear view of the grip mechanism.
Figure 21:
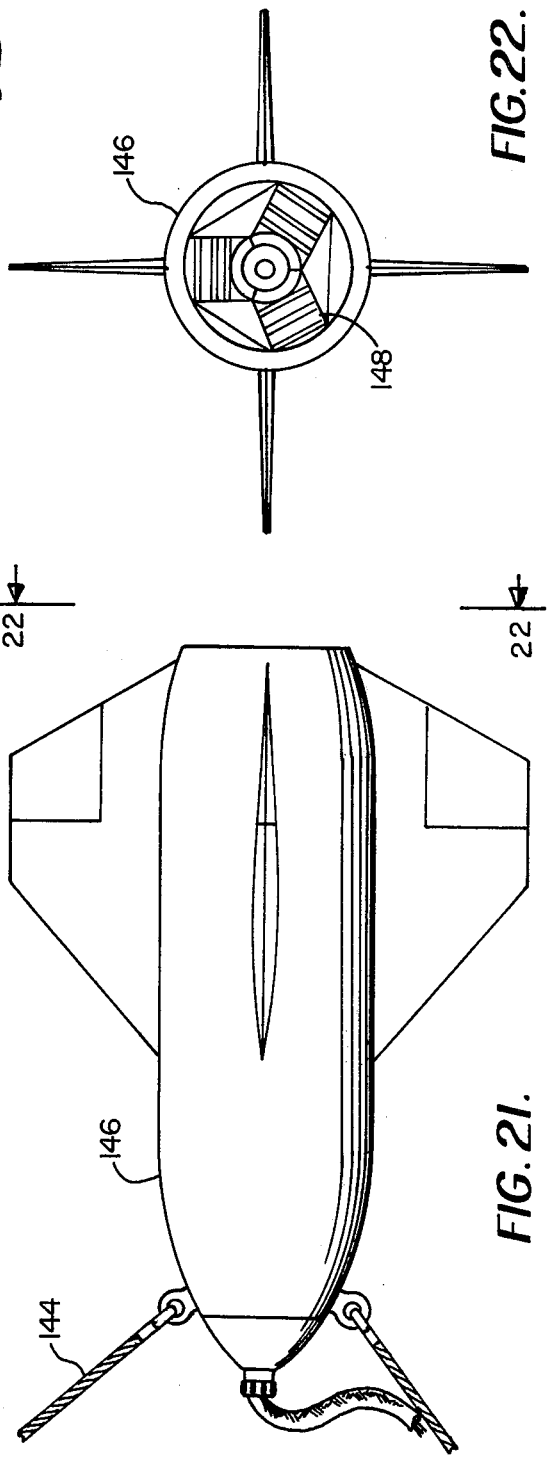
FIG. 21 is a side view of a grip mechanism for towing the skimmer in the manner shown in FIG. 19.

The tow cables 144 from vessels 130 are joined to a powered jaw coupler 146 which holds the towing coupler 18 in a manner previously described in conjunction with FIG. 16. Jaw coupler 146 is similar to conduit coupler 96 except that it is a separate self-contained unit as shown in FIGS. 21 and 22 with fins for control and stabilization when moving through the water. As shown in the end view of FIG. 22, three jaws are provided for griping the ball of coupler 18.

From the foregoing, it can be readily realized this invention can assume various embodiments. Thus, it is to be understood that the invention is not limited to the specific embodiments described herein, but is to be limited only by the appended claims.

What is claimed is:
1. A submarine skimmer comprising:
   a hull completely submersible in a liquid;
   a surge tank within said hull;
   a movable funnel having an outlet end hingedly coupled to said surge tank and feeding into said tank, and an inlet end positionable at selected elevations above said hull by rotating said funnel about said outlet end;
   seal means adjacent said outlet end of said funnel, said seal means preventing liquid from leaking into said surge tank and into said hull;
   lift means coupled to said hull and to said funnel to position said inlet end at said selected elevations;
   a conveyor within said funnel for moving liquid from said inlet end down said funnel to said outlet end;
   means for removing liquid from said surge tank to outside said hull, said removing means being coupled to said tank and to said hull;
   sensing means adjacent said inlet end of said funnel for determining when said inlet end is adjacent the surface of the liquid, said sensing means providing a signal to said lift means so that said lift means maintains said inlet end adjacent the surface of the liquid; and
   means for moving said skimmer through said liquid under the surface of said liquid so that said inlet end can move through the liquid adjacent its surface and skim off material from the surface of the liquid.

2. The skimmer as claimed in claim 1, wherein said means for moving said skimmer comprises a coupler adjacent the forward end of said hull for coupling said skimmer to a propulsion vehicle.

3. The skimmer as claimed in claim 2, wherein said coupler includes electrical coupling means for coupling electrical power from an outside source to said skimmer.

4. The skimmer as claimed in claim 1, including door means mechanically coupled to said funnel for closing said funnel to the flow of liquid into said tank.

5. The skimmer as claimed in claim 4, wherein said door means comprises a pair of doors, each door being hinged to said inlet end of said funnel to provide a closed position across said inlet preventing flow of liquid into said funnel and an open position spread outward of said inlet to gather and channel the liquid being skimmed into said funnel, whereby the effective width of said inlet is increased.

6. The skimmer as claimed in claim 1, wherein said removing means comprises:
   a conduit from inside said tank to outside said hull; and
   conduit coupling means on the end of said conduit adjacent said hull for joining said conduit to an outside conduit.

7. The skimmer as claimed in claim 6, wherein said removing means includes a valve means for opening and closing said conduit.

8. The skimmer as claimed in claim 6, wherein said conduit coupling means is integral with said means for moving said skimmer.

9. The skimmer as claimed in claim 6, wherein said removing means includes;
   a pump for pumping liquid thru said conduit means.

10. The skimmer as claimed in claim 6, wherein said conduit coupling means comprises a conduit mating joint and a load-carrying hitch for towing the outside conduit.

11. The skimmer as claimed in claim 10, wherein said hitch comprises hinged jaws for holding a mating ball on the outside conduit and a compression hinge for locking said jaws.

12. The skimmer as claimed in claim 11, wherein said inlet end of said funnel comprises an inlet head having pivot means coupling said inlet head to said funnel and a head leveler means coupled to said inlet head to maintain said inlet head level with the surface of the liquid being skimmed.

13. The skimmer as claimed in claim 12, wherein said head leveler means comprises:
   a float positioned adjacent said inlet head; and
   an adjustable coupler coupling said float to said inlet head, whereby said head is held substantially parallel to the surface of said liquid being skimmed.

14. The skimmer as claimed in claim 1, wherein said liquid in which said hull is submersible is predominately water and the material being skimmed from said liquid is oil; and wherein said removing means comprises a first conduit coupled to the bottom of said tank and a pump coupled to said first conduit for removing water from said tank to overboard, and a second conduit coupled to said tank above said first conduit, a second pump coupled to a second conduit for removing oil from said tank, and a conduit coupling means for joining said second conduit to an outside conduit.

15. The skimmer as claimed in claim 1, wherein said conveyor comprises an endless belt extending between two rotating wheels, said belt having spaced apart paddles on its outer surface.

16. The skimmer as claimed in claim 5, including fence-coupling means on each of said pair of doors, whereby when a fence is coupled to said fence-coupling means, material on the surface of the liquid which is confined within the fence is guided into said funnel as said skimmer moves through the liquid.

* * * * *